(No Model.) 7 Sheets—Sheet 1.
C. CUMMINGS.
APPARATUS FOR TRANSMITTING POWER BY MEANS OF COMPRESSED AIR.
No. 456,941. Patented Aug. 4, 1891.
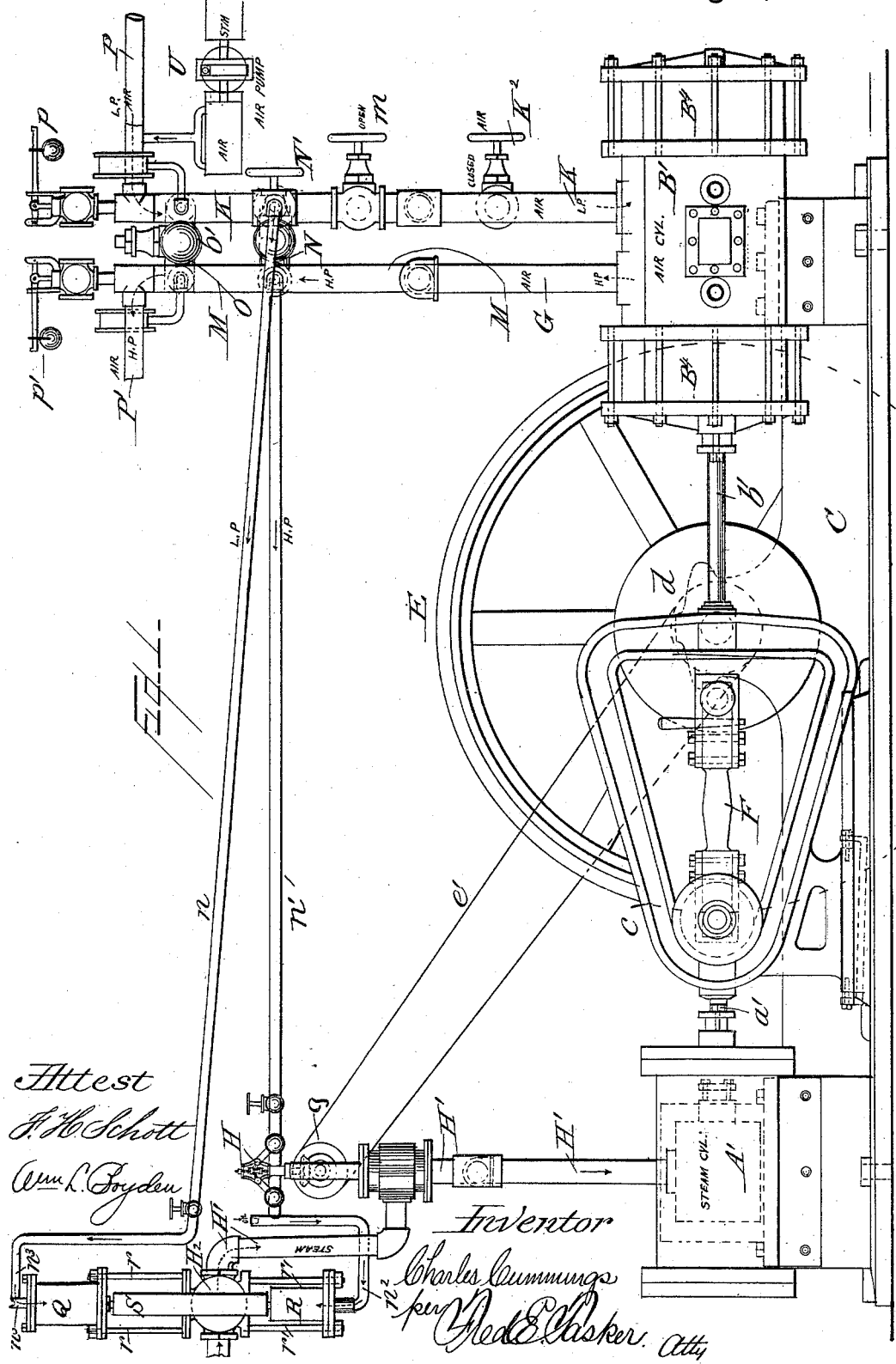

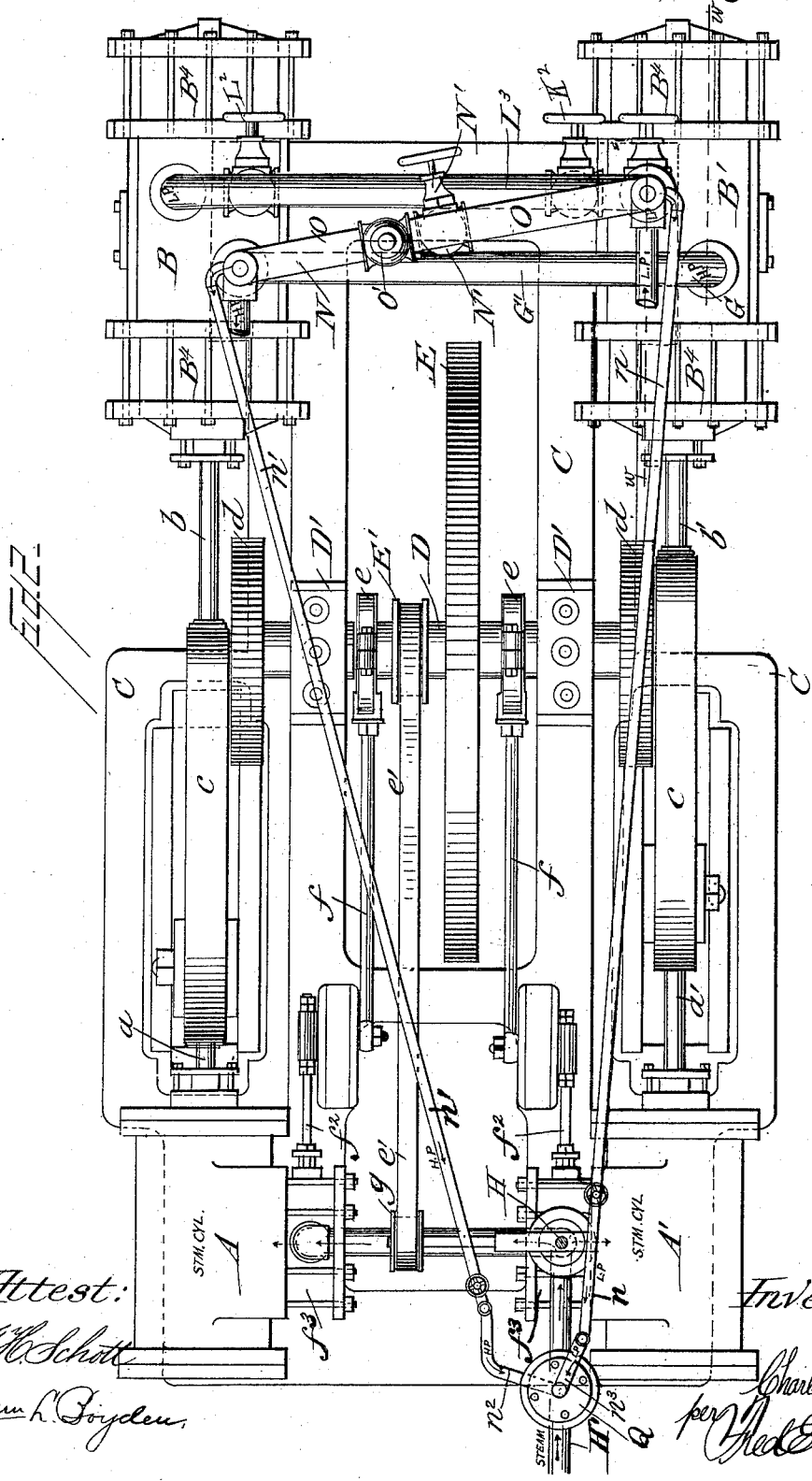

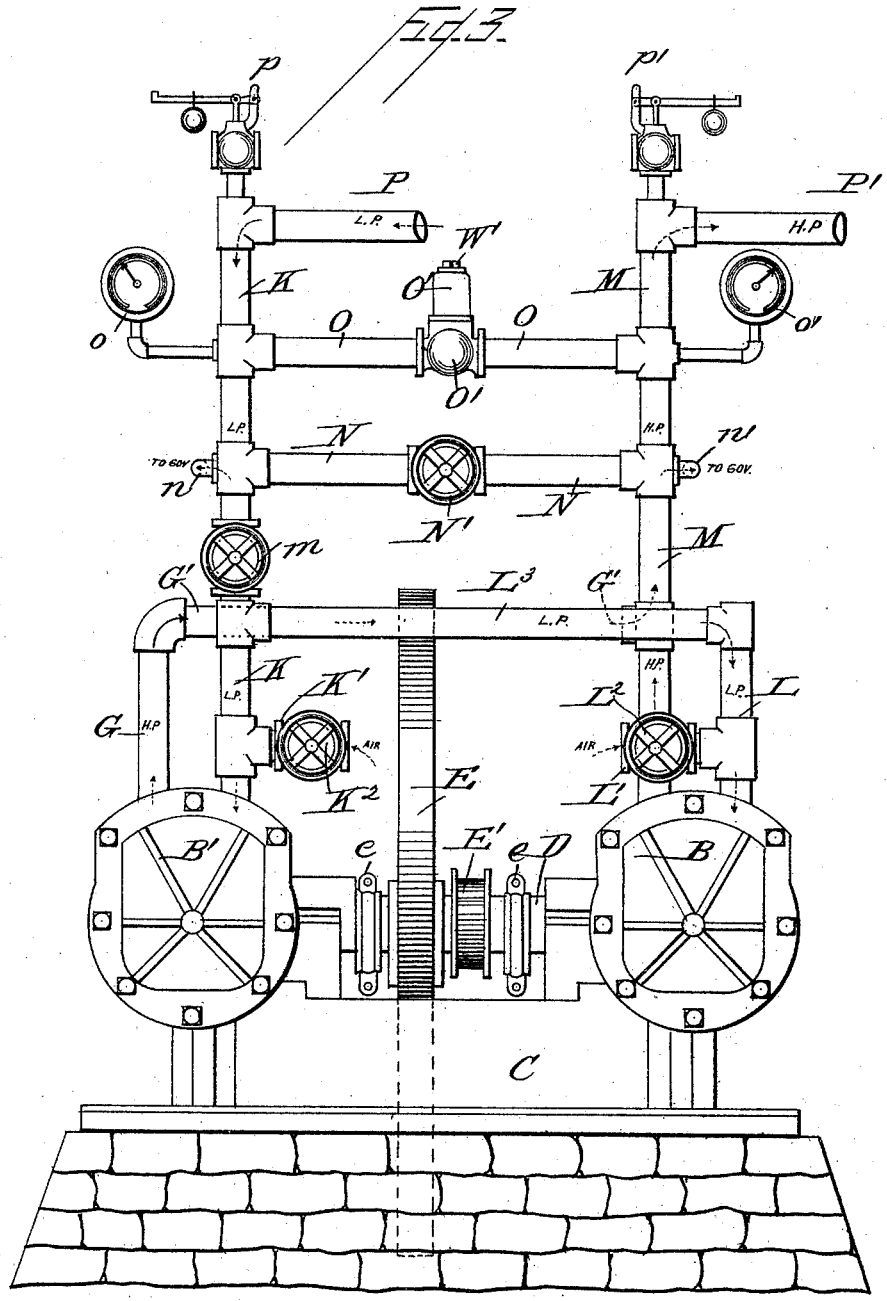

(No Model.) 7 Sheets—Sheet 4.
C. CUMMINGS.
APPARATUS FOR TRANSMITTING POWER BY MEANS OF COMPRESSED AIR.
No. 456,941. Patented Aug. 4, 1891.
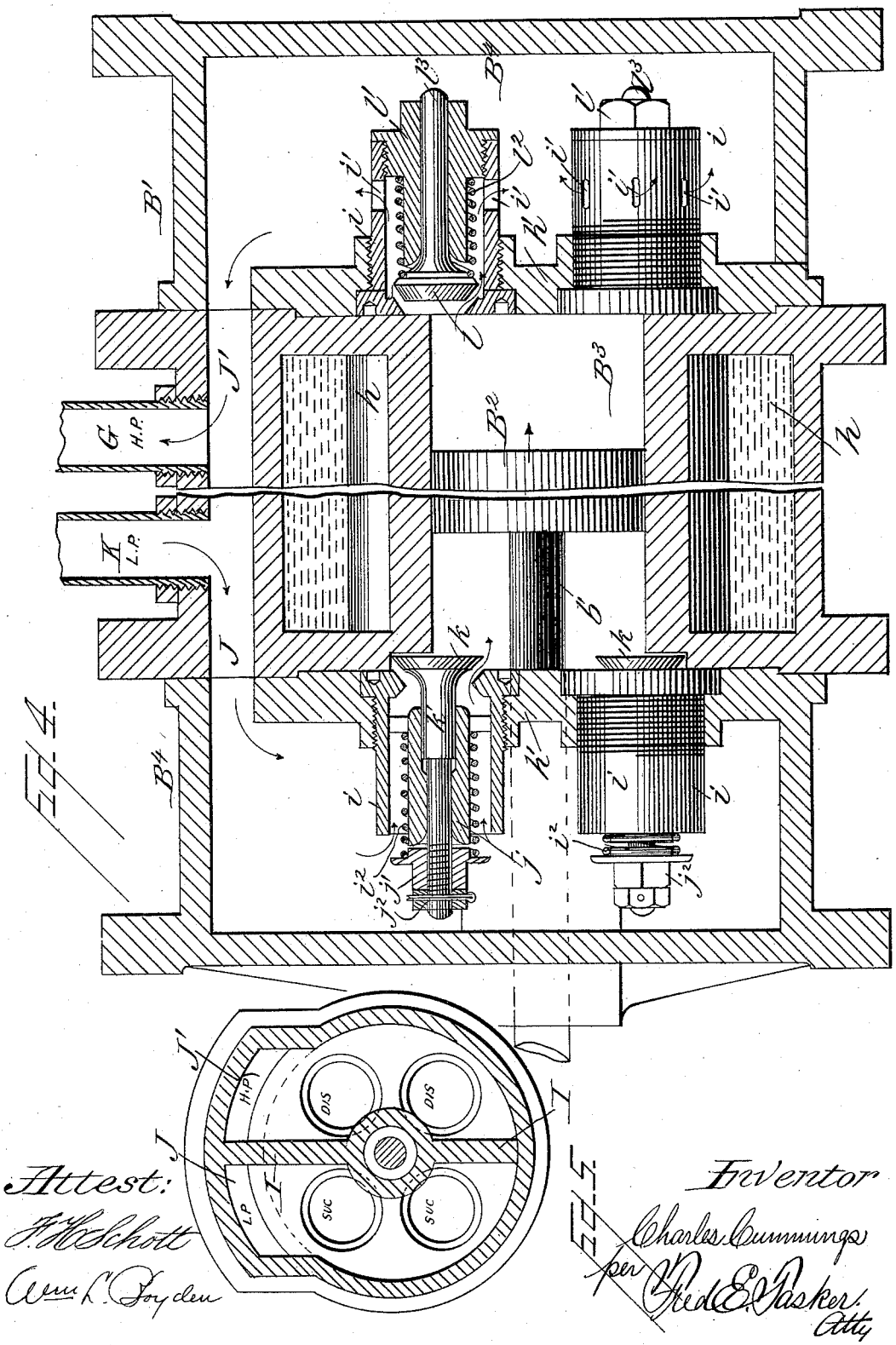

(No Model.) 7 Sheets—Sheet 5.
C. CUMMINGS.
APPARATUS FOR TRANSMITTING POWER BY MEANS OF COMPRESSED AIR.
No. 456,941. Patented Aug. 4, 1891.
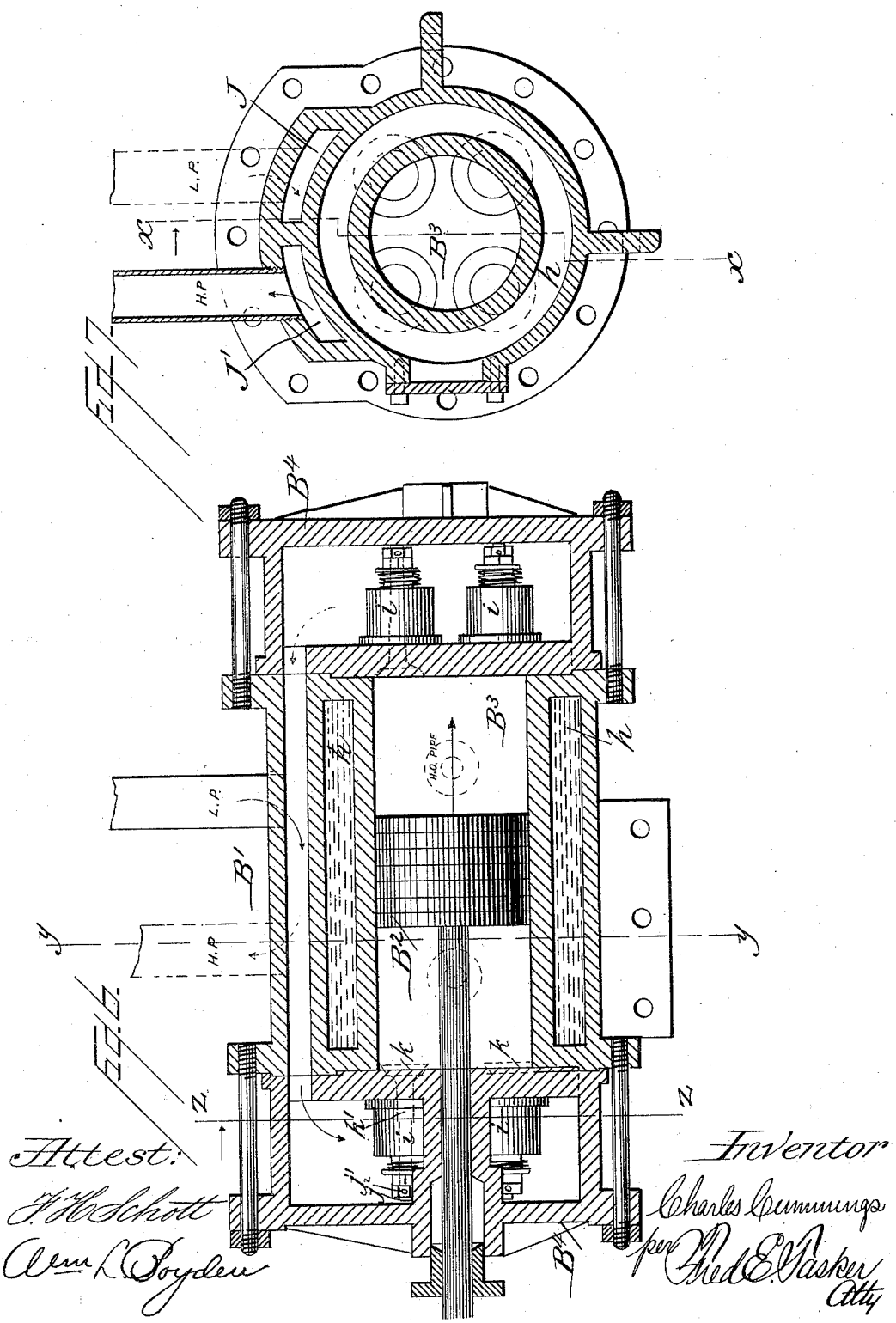

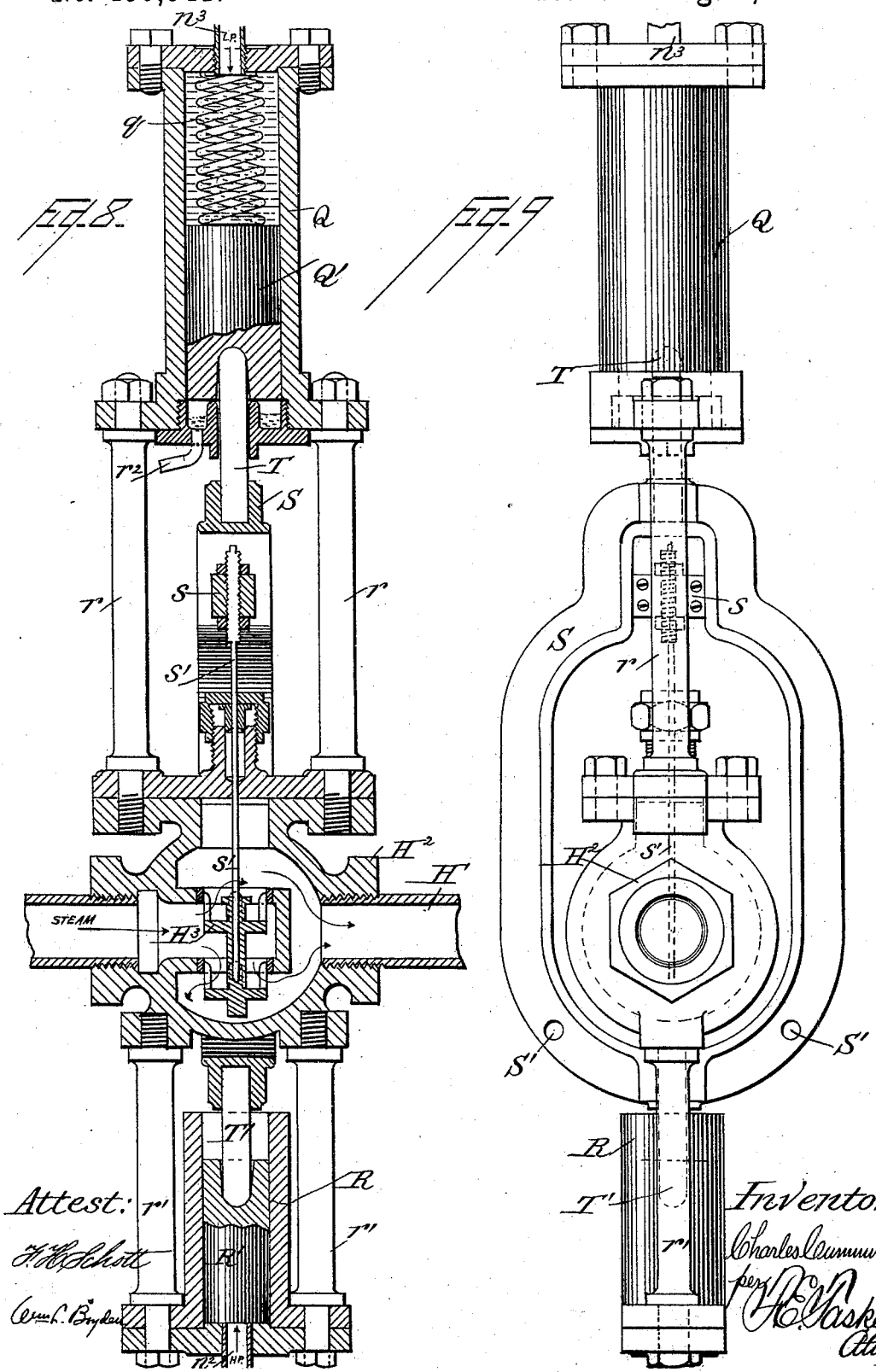

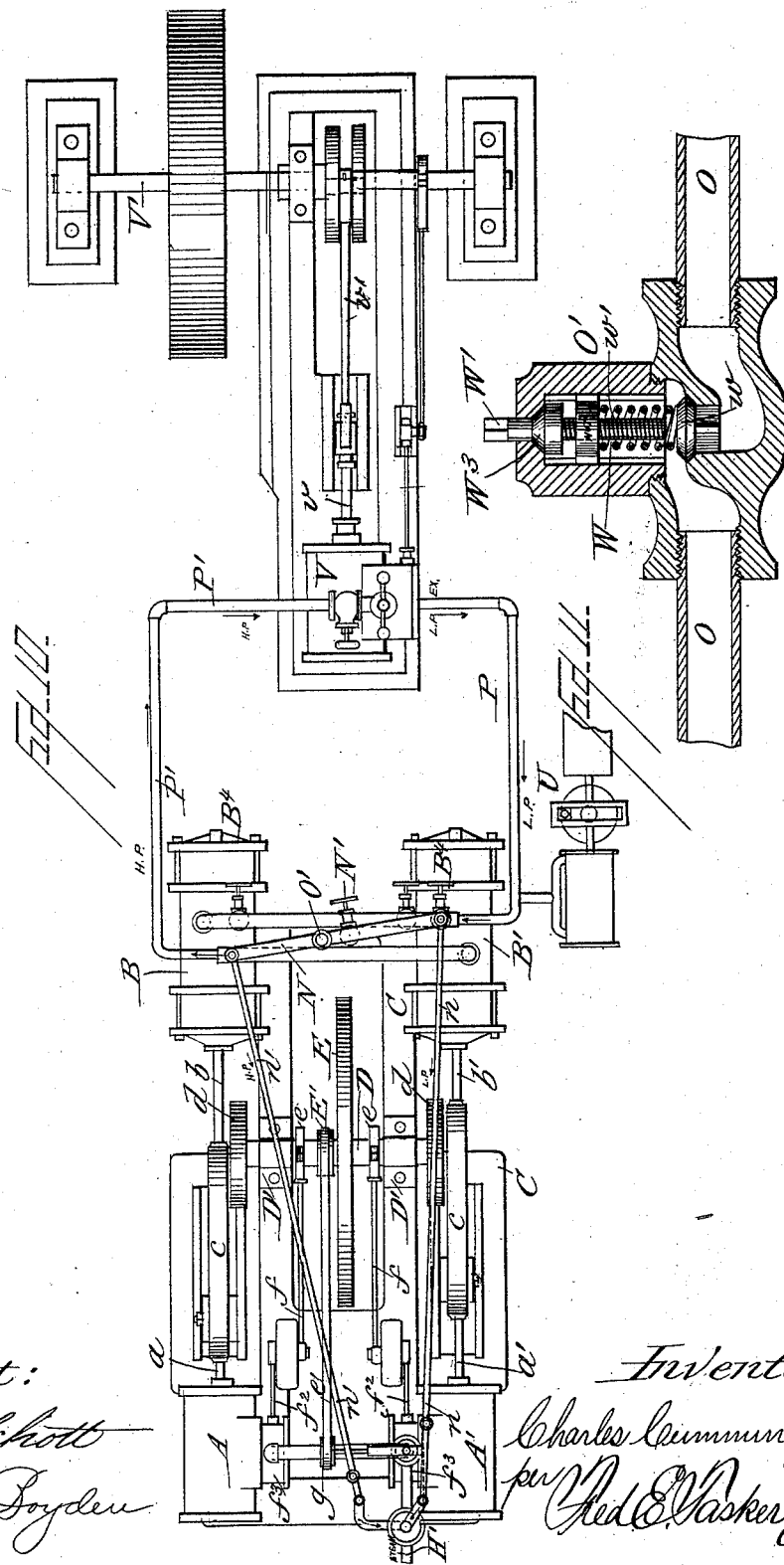

UNITED STATES PATENT OFFICE.

CHARLES CUMMINGS, OF OAKLAND, CALIFORNIA.

APPARATUS FOR TRANSMITTING POWER BY MEANS OF COMPRESSED AIR.

SPECIFICATION forming part of Letters Patent No. 456,941, dated August 4, 1891.

Application filed June 12, 1890. Serial No. 355,228. (No model.)

*To all whom it may concern:*

Be it known that I, CHARLES CUMMINGS, a citizen of the United States, residing at Oakland, in the county of Alameda and State of California, have invented certain new and useful Improvements in Apparatus for Transmitting Power by Means of Compressed Air; and I do hereby declare the following to be a full, clear, and exact description of the invention, such as will enable others skilled in the art to which it appertains to make and use the same.

This invention relates to machinery for transmitting power by means of compressed air or other gases, the object of the invention being to provide better, cheaper, more compact, and more efficient mechanism for the purpose indicated, whereby the best results may be achieved in the application of energy to successful work at a point distant from where the energy is generated with the least possible percentage of loss of energy in the transmission; and the invention consists, essentially, in the construction, arrangement, and combination of parts for carrying into practical effect and operation the underlying principle or method upon which the invention is based, which is—to wit, the employment of two unequal pressures of air, both above the normal atmospheric pressure and maintained at a constant ratio to each other, the air circulating through a system of pipes or conduits and other parts, which system is closed to the external atmosphere after the apparatus has once been charged, and said confined body of air being alternately expanded and compressed during the circulation, all substantially as will be hereinafter fully described, and then more particularly pointed out in the subjoined claims.

In the annexed drawings, illustrating my invention, Figure 1 is a side elevation of my improved machine for transmitting power by means of compressed air or other gases. Fig. 2 is a top plan view of the same. Fig. 3 is a right-hand end elevation. Fig. 4 is an enlarged longitudinal section on the line $w$ $w$ of Fig. 2. Fig. 5 is a cross-section on the line $z$ $z$ of Fig. 6. Fig. 6 is a longitudinal section on the line $x$ $x$ of Fig. 7. Fig. 7 is a cross-section on the line $y$ $y$ of Fig. 6. Fig. 8 is a vertical section of the air governor device for maintaining the unequal air-pressures at a fixed and constant ratio. Fig. 9 is a side elevation of the same. Fig. 10 is a plan view of the entire apparatus on a diminished scale and shows an example of driven machinery. Fig. 11 is a vertical section of the automatic valve which is sometimes used.

Like letters of reference designate corresponding parts throughout all the different figures of the drawings.

My invention aims by novel means to practically embody a novel principle or method which has never to my knowledge been carried into actual operation in a practical machine. This principle or method consists in the use of two unequal pressures of air, each above the normal atmospheric pressure and bearing to each other a fixed ratio, which is kept constant, the body of air which is held at these two pressures being confined in a closed system. It will be remembered that in the common and well-known machine for transmitting power by means of compressed air the air is drawn into the compressing-engine from the open atmosphere, after which it is compressed until its expansive force is sufficient to perform the intended duty where the power is required. The compressed air, after acting on the motor or engine where the power is applied, is exhausted back into the atmosphere, thus falling again to the normal atmospheric pressure.

In my improved apparatus I employ two air-pressures, both above the atmospheric pressure instead of one increased pressure and the ordinary atmospheric pressure, as in the common machine, and in my apparatus the air used is not drawn from the atmosphere or exhausted thereinto during the operations of the apparatus after it has once been charged, except for the incidental purpose of supplying the slight loss occasioned through leakage; but the operations of the apparatus are performed on a confined body of air shut off from communication with the external atmosphere. I have a suitable driving apparatus or power device which actuates the air-compressor. This compressor is so constructed and works in such a way as to create two pressures of air, both above the ordinary atmospheric pressure, one being, for example, one hundred pounds to the square inch and the other, for example, two hundred pounds to the square inch, the high pressure in this case being double the low pressure, or the ratio as two to one. There is a system of pipes provided with valves, which pipes carry the air to the driven apparatus, where the compressed air is to do its work. The air circulates constantly between the compressor and the motor, passing through reservoirs or receivers, if desired, and in this driven machine the unequal air-pressures will be on opposite sides of the piston, thus leaving the piston unbalanced and permitting it to move in the ordinary way. Hence in one part of this circulating system the air is at one pressure, while in another part it is at another pressure, the air thus being subject to constant change from one pressure to another as it circulates. This change takes place alternately, the air, when at high pressure, doing its work in the motor and then exhausting into the low-pressure air and so continuing until it again reaches the compressor and is reconverted into high-pressure air. This change of volume takes place with but little loss of power through heat, so that efficiency in the operation of the machine is promoted.

C denotes the main frame or bed of the machine, which may be of any suitable and desirable form to permit the convenient arrangement thereon and therewith of the several mechanical parts.

B B' designate the two parallel cylinders of the air-compressor. I preferably use two, although there may be any number. The air-compressor is driven by any suitable means. Steam is the motive power in the example of mechanism illustrated in the drawings.

A and A' denote the steam-cylinders, which are of any usual pattern. The piston of cylinder A has piston-rod $a$. Cylinder A is, for the sake of convenience, located in line with the air-cylinder B of the air-compressor. This latter cylinder has its piston provided with piston-rod $b$, which is in line with the piston-rod $a$. Between the piston-rods $a$ and $b$ is the yoke $c$, which is firmly connected to both rods. The piston of cylinder A' has piston-rod $a'$. Cylinder A' is, for the sake of convenience, located in line with the air-cylinder B' of the air-compressor. This latter cylinder has its piston provided with piston-rod $b'$, which is in line with the piston-rod $a'$. Between the piston-rods $a'$ and $b'$ is the other yoke $c$, which is firmly connected to both rods.

The main shaft D of the steam-engine is carried horizontally in suitable bearings D' D' on the main frame C. At each end of this main shaft are the crank-disks $d$ $d$, having their crank-pins set at right-angles, so that the engine may start when the connecting-rods are in any position, to which are pivoted the connecting-rods F F, which are connected at their other ends at points within the yokes $c$ $c$. (See Fig. 1.) On the drive-shaft D are also the band-wheel E, governor-pulley E', and eccentrics $e$ $e$, said eccentrics having the eccentric-rods $f$ $f$, that are connected to the valve-rods $f^2$ $f^2$, belonging to the valves within the valve-chests $f^3$ $f^3$ on the sides of the two steam-cylinders A and A'. The belt $e'$, passing around the governor-pulley E', runs also over the pulley $g$ on the shaft of the ball-governor H, (see Figs. 1 and 2,) which is of any common and well-known construction for a steam-governor and which serves the usual purpose by controlling a valve in the steam-pipe H', which runs from the boiler to the steam-cylinders, passing on its way through the air-governor, as shown in Fig. 1, the construction of which air-governor will be presently explained.

The ball-governor is used to avoid accidents in case anything happens to the air-governor, and is of course adjusted properly for this purpose. I have thus given a summary description of the steam-engine, which in the present example of my invention I have arranged for driving the air-compressor. It will be understood, and I here emphatically state, that said compressor may be operated by any motor, if desired, as well as by a steam-engine. Therefore the engine herein shown and described is simply given as one convenient type or form of mechanism for the purpose.

I will now proceed to describe the construction of the mechanism for compressing the air in such a manner as to produce the two unequal air-pressures, both above the normal atmospheric pressure, which I have already above alluded to as being the foundation idea of the invention.

B and B' represent, as we have seen, the two air-cylinders, within which are the pistons $B^2$, one of which has the piston-rod $b$ and the other the piston-rod $b'$. By referring to Figs. 4, 5, 6, and 7 the construction of these air-cylinders will be clearly seen. They are constructed similarly.

$B^3$ denotes the bore of the cylinder, within which the compressing-piston $B^2$ is fitted and wherein it operates. This bore is preferably surrounded with a water-jacket $h$ for the purpose of keeping the parts from becoming heated during the operation of compressing the air. The cylinders are provided at each end with hollow heads $B^4$ $B^4$, which are bolted or otherwise firmly secured to the main body of the cylinder, as shown in Fig. 6. Each of the hollow heads $B^4$ is divided by a vertical partition I (see Fig. 5) into two compartments, and in the main body of the cylinder, above the water-jacket $h$, are two horizontal channels J and J', divided by a longitudinal partition or wall exactly in line with the partitions I I in each head, so that the chambers in the heads, in conjunction with these channels J and J', which communicate therewith, form two separate and distinct longitudinal compartments. The bore $B^3$ has the heads $h'$ $h'$, which constitute the inner vertical walls of the hollow heads $B^4$, being an integral part thereof, each of which heads or walls $h'$ is provided with four openings, (see Fig. 5,) two of which lie on one side of the partition I and two on the other side. At each of these openings a valve is arranged. The hollow heads are of sufficient size to contain the mechanism of these valves, as shown. There are therefore four valves at each end of the cylinder-bore $B^3$, and two of these four open inwardly into the bore as suction-valves, while the other two open outwardly from the bore as discharge-valves, a pair of suction-valves being on one side of partition I, and thus between one of the longitudinal compartments and the bore $B^3$ of the cylinder, and a pair of discharge-valves being on the opposite side of the partition, and thus between the other longitudinal compartment and the bore of the cylinder, it being noted, furthermore, that one compartment of the air-cylinder, which I term the "low-pressure" compartment, because it contains air at the lower of the two unequal pressures already spoken of, is provided with four valves on the ends of the bore, which valves are all suction-valves, and also that the other compartment of the air-cylinder which I term the "high-pressure" compartment, because it contains air at the higher of the two unequal pressures already mentioned, is provided with four valves on the ends of the bore, which valves are all discharge-valves and permit the compressed air to be discharged through them from the bore into the high-pressure compartment; or, as it may be otherwise stated, each end of the bore is furnished with four valves, two suction and two discharge, the suction serving to admit air to the cylinder to be compressed and the discharge to allow the exit of the air after compression, all of said valves opening so as to establish proper communication with the respective compartments. Proceeding now to describe more minutely the specific construction of these valves so as to show one way in which they may be built, it being evident, of course, that the structural details may vary greatly in practice, we see that at each of the openings in the bore ends $h'$ $h'$ a valve-casing $i$ is screwed horizontally into the head. The casings $i$ which belong to the discharge-valves are perforated with a suitable number of openings $i'$ $i'$. The casings $i$ which belong to the suction-valves are preferably imperforate, but open-ended. In the suction-valves, one of which is shown in detail at the left in Fig. 4, a stationary tubular casting $j$ is supported by a vertical perforated diaphragm within the valve-casing $i$ in such a manner as to leave an annular space between the casting and the casing. $k$ indicates the valve, having an inclined seat and adapted to open inwardly into the bore $B^3$. The valve-stem $k'$ of valve $k$ lies horizontally within the tubular casting $j$. On the outer end of stem $k'$ is a nut $j'$, having a flange thereon, and likewise a jam nut or collar $j^2$, secured in place by a pin. A coiled spring $i^2$ surrounds the casting $j$ and is tensioned between the flange on nut $j'$ and the diaphragm which supports the casting in position. The spring is so arranged as to normally keep the valve closed; but when the pressure on the other side of the valve in the bore $B^3$ falls below the pressure in the valve-casing, plus the slight power of the spring, the valve will open, overcoming the resiliency of the spring and compressing the same, and thus permitting air to pass through the valve. Air enters the suction-valve, as will be seen, through the annular opening at the end of the valve-casing. The discharge-valves have a slightly different construction. The casing $i$ of these valves is perforated, as we have seen. A casting $l'$ lies within the perforated casing, so as to leave an annular space, the outer part of this casting being enlarged and screwed into the outer end of the valve-casing. $l$ denotes the valve, having the stem $l^3$, which lies within a horizontal passage in the casting $l'$, the seat of the valve being beveled and the valve designed to open outwardly from the bore. A spring $l^2$ is coiled around the casting $l'$, bearing at one end against the valve $l$ and at the other end against a shoulder on said casting. Hence when valve $l$ opens the spring is compressed, and said spring serves to close the valve at the proper time. Obviously when the pressure within bore $B^3$ against the face of the valve $l$ is greater than the air-pressure within the valve-casing and adjacent compartment, plus the slight power of the spring, the discharge-valve will open and allow the passage of air out of the bore $B^3$.

From the foregoing description of the construction and location of the suction and discharge valves it will be evident that when the piston $B^2$ moves to the right in the direction of the arrow as shown in Fig. 4 the two suction-valves in its rear, which lead from the low-pressure compartment of the cylinder, will, in consequence of the vacuum created in the rear of the moving piston, be opened to permit air to flow in behind the piston, said inflowing air being either of atmospheric pressure or of a higher pressure, as the case may be. The two discharge-valves in the rear of the piston, which communicate with the high-pressure compartment of the cylinder, are at this time closed, while the two suction-valves in front of the moving piston will be closed, the air being compressed against them; but the two discharge-valves which lead into the high-pressure chamber in front of the moving piston will, when the air is compressed against them, be opened, allowing the air at a higher pressure to enter the chamber of higher pressure. When the compression-piston reverses its movement, a similar operation will take place, the air now entering through the other two suction-valves, while the air in advance of the piston is delivered in a compressed condition into the high-pressure chamber through the other pair of discharge-valves.

The upper side of the air-cylinder B' is entered by a vertical pipe K, which discharges air into the channel J, that connects the two head chambers, which, taken together and in conjunction with said channel J, constitute the low-pressure compartment of the air-cylinder. (See Figs. 3 and 4.) The upper side of the air-cylinder is also entered by another vertical pipe G, which receives air from the channel J', that connects the two head chambers, which, taken together and in conjunction with said passage J', constitute the high-pressure compartment of air-cylinder B'. The pipe K has a short horizontal branch pipe K', which is provided with a valve K², said branch pipe K' opening into the atmosphere. The pipe K is therefore an air-induction pipe for delivering air to the cylinder B' and the pipe G an air-eduction pipe for withdrawing and carrying air from the said cylinder, the former being a "low-pressure" pipe, so called, and conveying air of atmospheric pressure (or of the lower of the two unequal pressures, as the case may be) into the cylinder, while the latter is a "high-pressure" pipe, so called, and conveys compressed air away from the cylinder. When the valve K² is open and the apparatus is being charged, the function of pipe K is to deliver atmospheric air to the cylinder; but after said valve has been closed and the valve m has been opened, then the pipe K serves to deliver to the air-cylinder air at a certain lower pressure, but above the atmospheric pressure, while the pipe G serves to carry from the cylinder compressed air at a certain higher pressure than the air in the induction-pipe, the air in the two pipes being thus of unequal pressures. The other air-cylinder B is suitably entered by induction and eduction pipes.

L denotes the induction or low-pressure pipe, situated vertically above cylinder B and entering through the upper side of the cylinder into the channel that forms a part of the low-pressure compartment of the cylinder. M denotes the eduction or high-pressure pipe located vertically above the cylinder B and entering through the upper side of the cylinder into the channel that forms a portion of the high-pressure compartment of this cylinder. The pipe L has a short horizontal branch L', which is provided with a valve L², said branch pipe L' opening into the atmosphere in the same way as the pipe K'. It will be readily seen that the function of the pipes L and M is the same as that of the pipes K and G. The pipes L and K, having a similar function, (being both low-pressure pipes,) are connected together by the horizontal pipe L³, and likewise the pipes G and M, having a similar function, (being both high-pressure pipes,) are connected together by the horizontal pipe G'. The pipes K and M, being the main low and high pressure pipes, extend upward vertically for some distance, or as far as may be necessary. They are connected together at one point by a horizontal pipe N, (see Fig. 3,) having therein a valve N', adapted to be operated by hand, and at a point above pipe N the pipes K and M are connected by another horizontal pipe O, which is provided with an automatic valve O'. The pipe O is only used at certain times, as will be hereinafter related. At the upper end of the low-pressure pipe K a pipe P is connected thereto, which runs from the motor or driven apparatus where the power is applied to the work, and also at the upper end of the high-pressure pipe M a pipe P' is connected thereto, which likewise leads to the driven apparatus, said pipe P' conveying the high-pressure air to said apparatus, while the pipe P carries the low pressure or exhaust back from said apparatus and assists in returning it to the compressor. The low-pressure pipe K is provided at a suitable point with a gage $o$ for indicating the pressure in the pipe, and also with a safety-valve $p$ for relieving any undue or dangerous pressure, and likewise the high-pressure pipe M is provided with a gage $o'$ and a safety-valve $p'$. In the low-pressure pipe K, at a suitable point above where the horizontal pipe L³ is coupled thereto, is a valve $m$, the function of which will be stated in describing the operation.

In Fig. 10 I have shown a plan view of the entire apparatus, including a plan view of one form of the driven machine. This driven machine or apparatus may obviously be of any kind and for any purpose or work, such as a common engine or a rock-drill pump or any other machine.

In the example delineated in Fig. 10, V denotes a cylinder, $v$ a piston-rod, and V' a driving-shaft, while $v'$ is the connecting-rod. The low-pressure pipe P and the high-pressure pipe P' are both connected to cylinder V, so that low-pressure air is on one side of the piston when high-pressure air is on the other side thereof, leaving the piston unbalanced and permitting the engine to operate as usual. This bare outline of a driven machine will serve to explain sufficiently and indicate how the pipes leading thereto are arranged and the power applied.

In order to govern the air-pressures, keeping them regular and constant and maintaining a fixed ratio to each other, I provide what I call an "air-governor." This governor has two main functions: first, to regulate the speed of the compressor with relation to the work to be done by the driven machine—i. e., to proportion the speed of the compressor so that any amount of work may be done that is required (within, of course, the limit of capacity of the machine)—and, second, to maintain the desired ratio between the pressures in the circulating-pipes.

$n$ and $n'$ designate two pipes leading from opposite ends of the pipe N, or one leading from high-pressure pipe M and one leading from low-pressure pipe K, said pipe $n$ being the one that leads from low-pressure pipe K and is filled with low-pressure air, while said pipe $n'$ is the one leading from high-pressure pipe M, and is consequently filled with high-pressure air. The course of the pipes $n$ and $n'$ is seen in Figs. 1 and 2.

The construction of the air-governor is seen in detail in Figs. 8 and 9. At the upper end of the governor is a vertical cylinder Q, containing a trunk-piston Q', having a certain area. This cylinder I preferably term the "low-pressure-governor" cylinder, because it is at that end of the governor where the low-pressure pipe $n$ arrives, and hence low-pressure air acts upon piston Q'. The cylinder Q above the piston Q' is filled with oil or some lubricant, and the upper end of the cylinder is provided with a projecting pipe $n^3$, through which the lubricant is fed into the cylinder when needed. This pipe $n^3$ is entered by the low-pressure pipe $n$, and therefore, speaking in strictness, the low-pressure air acts against the lubricant instead of against the piston; but the surface is of the same area, and hence the result is the same. Between the upper head of cylinder Q and the piston Q' is a spring $q$, immersed in the lubricant, which spring allows the valve to open and close gradually and cushions the movement. Furthermore, it will be noted with respect to cylinder Q that its lower end is provided with an oil-drip pipe $r^2$ to receive any oil that may possibly leak between the piston and cylinder. At the lower end of the governor is another cylinder R, containing a trunk-piston R', having a certain area less than the area of piston Q'. This cylinder I preferably term the "high-pressure-governor" cylinder, because it is situated at that end of the governor where the high-pressure pipe $n'$ arrives, and hence high-pressure air acts upon the piston R'. The lower end of the cylinder R is filled with lubricating-liquid inserted thereinto through the bent pipe $n^2$, the upper end of which is higher than cylinder R. This pipe is entered by the high-pressure air-pipe $n'$, and therefore, speaking more accurately, the pressure of the air is exerted directly upon the oil or lubricant instead of upon the piston R'; but the result is the same. Between the upper cylinder Q and the lower cylinder R is a hollow valve-chamber $H^2$, through which the steam-pipe H' passes. Said valve-chamber $H^2$ is secured to cylinder Q by the vertical bolts $r\ r$, passing through flanges on the cylinder and on the chamber. It is also connected to cylinder R by the vertical bolts $r'\ r'$, which pass through suitable flanges on the valve-casing and on the cylinder R. In this way the two cylinders and the valve-casing are firmly fastened together in such a manner as to leave a convenient space between the valve-casing and each cylinder, the bolts or rods $r\ r$ and $r'\ r'$ being long enough to permit of this.

S indicates a yoke having a general oval form and surrounding loosely the valve-chamber $H^2$, the upper end of the yoke being in suitable proximity to the bottom of the cylinder Q, while the lower end of the yoke is near to the upper end of cylinder R.

T denotes a short bar or rod, the upper end of which enters loosely a socket in the lower end of the piston Q', said bar passing through the bottom of cylinder Q, while the lower end of the bar or rod T enters loosely a socket in the top end of yoke S. This rod T is held in place by the downward pressure of the piston Q'. Another rod or bar T' has its upper end received loosely into a socket at the bottom of the yoke S, while its lower end loosely enters a socket in the piston R', belonging in the high-pressure cylinder R. The rod T' is held in place by the upward pressure of the piston R'. Near its upper end the yoke S is provided with a cross-connection $s$, having a nut which holds the screw-threaded end of a valve-rod $s'$. This rod carries the valve $H^3$ at its lower end within the steam-pipe H', said valve being of any suitable and preferred construction and arranged to graduate the flow of steam through the steam-pipe from the boiler to the engine in proportion to the amount of work to be done, and also to control the flow whenever it may be necessary to thus cut off or graduate the amount of steam, and thereby govern the speed of the engine and compressor. Said valve operates automatically. I will now detail the operation of this governor device. It keeps the ratio of the air-pressures constant and controls the speed of the compressor in proportion to the amount of work to be performed. Its function is not to maintain a uniform speed under all circumstances, as is the case with the ordinary steam-engine governor; but my air-governor is designed to automatically vary the speed of the compressor to suit the work being done by the driven machine, and the speed of the compressor is of course by varying the speed of the motor-machine, which in the present example is the steam-engine. Thus one kind of driven device—such as one rock-drill—may require a certain number of revolutions of the steam-engine per minute to actuate the compressor sufficiently to transmit the required power to drive said drill. Obviously two of these drills will require twice as many revolutions of the actuating-engine to drive them. The air-governor automatically varies the steam-supply so as to control the speed of the engine and enable it to perform the required duty. Likewise the said governer keeps the ratio of pressure constant.

If at any time the compressor runs faster than is necessary, so as to compress more air than is required to drive the driven machine, the pressure in the high-pressure pipe will increase and that in the low-pressure pipe will diminish, and the variation of pressures influences the air-governor, so that it tends to lessen the speed of the compressor and restore the normal ratio of pressures. On the other hand, if at any time the compressor is running slower than is necessary to compress air as fast as the driven device requires, the pressure in the high-pressure pipe will decrease and that in the low-pressure increase, and this variation of the ratio, acting on the air-governor, tends to increase the speed of the compressor and restore the normal ratio of pressures. When the same conditions of work to be done obtain, the air-governor keeps the ratio of pressures constant by regulating the speed of the motive power and keeping it constant so long as the conditions of work do not change. When the conditions of work vary through inequalities in the rock or a multiplication of the drilling devices, (supposing the driven device to be a drill,) then the air-governor operates upon the motor-engine and automatically changes and proportions its speed to conform to the change in the work and make it capable of doing more or less work, as may be required, maintaining all the while a constant work. Evidently increase of work to be done will lessen the amount of high-pressure air, thus causing the valve to open wider and the engine to run faster to supply the required amount of high-pressure air.

The areas of the two pistons Q' and R' have the same ratio as the air-pressures. Thus, if the high-pressure air is two hundred pounds to the square inch and the low-pressure air is one hundred pounds to the square inch, the area of piston Q' will be twice the area of piston R', since the pressures upon one inch of surface of piston R' will be balanced by the pressure upon two inches of surface of piston Q'. In this case, therefore, when the pressure in pipe $n$ is one hundred pounds and the pressure in pipe $n'$ is two hundred pounds, these pressures will exactly balance each other in the governor and the pistons and other parts will remain in equilibrium. When the governor is in this condition, the parts may be adjusted up or down by hand and (but for the spring $q$) would remain in any position where they might be placed. The spring $q$, however, is interposed above the piston Q', so as to add a little excess of pressure to that end of the governor and disturb what would otherwise be an equilibrium sufficiently to keep the valve $H^3$ normally open, although the spring $q$ is of slight power and readily overcome by any slight increase in the high-pressure air. The spring is further advantageous in allowing a gentle motion in the parts of the governor. It cushions the end of the piston and prevents the shock which might take place when a change of ratio suddenly occurs and disturbs the equilibrium. The present example of governor is described simply as an example. Especially is this true with respect to the areas of the pistons Q' and R.' These areas vary, of course, in different governors where different ratios between the air-pressures than that of two to one are employed in the apparatus.

In order to change the ratio of pressures without altering the pistons, weights may be hung upon the yoke S at the perforations S'.

I will now explain the operation of the main apparatus.

Referring to Figs. 2 and 3, I will first describe the operation when cross-pipe N, having valve N', is used and cross-pipe O is supposed to lie idle or is removed from the apparatus. First, the valves $K^2$ and $L^2$ will be opened to admit atmospheric pressure air into the pipes L' and K' and thence into the compressing-cylinders. The valve N' will also be opened, usually by the hand of the operator, it being non-automatic, and the valve $m$ closed. Then the compressor will be set to work, and air will be drawn from the atmosphere into the compressing-cylinders, compressed therein, and sent through the pipes G M N K above valve $m$ and pipes P and P'. The compressed air in the entire system will of course be now at the same pressure and a like degree of pressure will be indicated on both gages—that belonging to the high-pressure pipe and that belonging to the low-pressure pipe. The operation of compressing will be continued until both gages register, say, one hundred pounds, supposing this to be the amount of the lower of the two unequal pressures. Then the operator will close valve N'. This will separate the system of low-pressure pipes from the system of high-pressure pipes, leaving the pressure in the former system fixed permanently at one hundred pounds. The operation of the compressor will continue until the air in the high-pressure pipes has attained a pressure of two hundred pounds, when the inlet-valves $K^2$ and $L^2$ will be closed by hand, preventing the admission of any more air, and the valve $m$ will be opened by hand, allowing air at a pressure of one hundred pounds to be delivered to the compressor-cylinders. We have now our closed system, wherein the air circulates between the compressor and the motor. The air in one part of the apparatus is at one hundred pounds pressure, as will be seen from one of the gages, and the air in the other part of the apparatus is at two hundred pounds pressure, as will be seen on the other gage. Here, then, are the two unequal pressures of air, both above the atmospheric pressure, the ratio of the pressures being as two to one, which ratio is kept constant by means of the air-governor, and this governor is found in actual practice to do its work so perfectly that hardly any fluctuation of the ratio is perceptible upon the gages or indicators with which the apparatus is provided. It will be noted that no atmospheric pressure air is drawn into the machine during its operation. The compressor always works upon air at one hundred pounds pressure instead of upon air at atmospheric pressure. To supply any trifling leakage that may take place, I provide a little air-pump U, (see Fig. 1,) which may be of any suitable and ordinary construction and which delivers into the low-pressure pipes at some suitable point.

I will now briefly describe the operation when the cross-pipe O, having the automatic valve O', is made use of. In this case the pipe N serves no necessary purpose, although the valve N' might be left open until all the pipes are filled with air at one hundred pounds pressure, but lies idle with the valve N' closed, and also the air-governor is not used, but the valves in the air-pipes $n$ and $n'$, running to the governor, (said valves are shown in Fig. 1,) are closed. In starting the apparatus the valves $K^2$ and $L^2$ will be open and the valve $m$ closed. The valve O' will likewise be closed. This valve is constructed to operate automatically, and is so arranged that it will open only when the pressure on one side of it is one hundred pounds greater than the pressure on the other side. Of course it may be adjusted for other pressures; but in the present example we suppose it to open at one hundred pounds pressure on one side above that on the other.

The detailed construction of the automatic valve is shown in section in Fig. 11. It consists simply of any ordinary valve $w$. W is the screw-threaded valve-rod having thereon a nut $W^2$, tongued to slide in grooves in the side of the valve-casing, the upper end of the valve-rod W projecting through the top of the casing and formed for the attachment thereto of a wrench, whereby the rod may be rotated and the nut $W^2$ moved up or down. A spring $w'$ envelops rod W and bears at one end against nut $W^2$ and at the other against the valve $w$. Thus it is evident that the adjustment of the nut $W^2$ adjusts the tension of the spring and so regulates the power which holds the valve closed. Hence the valve may be adjusted so as to open at any desired degree of pressure. On the upper part of the rod W, within the casing, is a beveled collar $W^3$, forming a seat at the upper end of the casing where the rod passes therethrough, so as to provide an air-tight joint at this point, said beveled seat being preferably used in lieu of an ordinary stuffing-box.

As the operation of compression proceeds, the high-pressure pipes will be filled with air having a pressure of one hundred pounds before any air will enter the low-pressure pipes. As soon as the pressure against the sides of valve O' attains one hundred pounds the valve will open and permit air to pass into the low-pressure pipes. As the compression continues, the air in the low-pressure pipes will finally stand at one hundred pounds and the air in the high-pressure pipes at two hundred pounds. The compression may continue beyond this, if desired, but probably it will not be. Then the valves $K^2$ and $L^2$ will be closed and the valve $m$ opened, and so we again have our closed system of pipes, within which the air circulates constantly, one gage standing at one hundred pounds and the other at two hundred pounds when the the ratio is one to two. This automatic-valve arrangement which I have just described is used only in certain cases, chiefly when the compressor is driven by a belt from some motor-shaft which actuates other machinery, which machinery it is necessary to drive with a steady uniform motion, and so the motor-shaft cannot have its speed varied, and hence an air-governor cannot be used, and therefore the automatic valve serves the purpose and keeps the difference of the pressures constant. It will be noted that this arrangement with pipe O, having valve O', accomplishes a different result from that accomplished by the air-governor, in that, while the air-governor serves to keep the ratio of the two unequal air-pressures constant, this automatically-operating valve serves simply to keep the difference of the pressures constant. In other words, it may be said that the automatic valve serves to regulate the arithmetical ratio of the two pressures, while the air-governor serves to keep the geometrical ratio of the two pressures constant. This is an important difference when we come to look at the result that is accomplished. Although this arrangement with pipe O is generally used with belt-machines and not in connection with the first arrangement, yet it may be made use of in connection therewith if at any time the air-governor should become disabled, and I make no special claim to novelty in the arrangement of the pipe O, with its regulating-valve, but simply include the same herein to more fully explain the uses and adaptation of my improved machine.

Numerous advantages accrue from the use of the invention herein described, a few of which it may be well to enumerate here, in order that the importance of the invention and the great utility and advantage in employing two unequal air-pressures, both above the atmospheric, may be clearly understood and appreciated.

Among the resulting benefits I will first mention that my machine for transmitting power by means of compressed air is much smaller and more compact, and therefore cheaper, easier of transportation, and very much lighter in weight than the machines now in use for doing a corresponding amount of work. This statement is easily proved by a simple calculation. Suppose it is desired to provide a cubic foot of air having a pressure of one hundred pounds at one stroke of the piston. Obviously if air at atmospheric or fifteen pounds pressure is to be compressed to this required pressure, the original volume of atmospheric air will be seven cubic feet or thereabout—i. e., seven times the volume of the required volume at one hundred pounds pressure. If air at fifty pounds pressure is to be compressed to the pressure of one hundred pounds, two cubic feet of the former will be required to make one of the latter.

In the ordinary air-compressor air is received into the machine at atmospheric pressure, and hence the cylinder must contain seven cubic feet, in order that the atmospheric air may at one piston-stroke be compressed to a cubic foot of one hundred pounds pressure. Suppose it is desired to work the ordinary air-compressor with an unbalanced pressure of one hundred pounds. In order that it may do this, air must be compressed to one hundred and fifteen pounds, so that there may be one hundred and fifteen pounds on one side of the piston and fifteen pounds, or atmospheric pressure, on the other side of it.

In my apparatus after it is charged, the air is delivered to the compressor at one hundred pounds pressure. Therefore if it is desired to obtain a cubic foot of air having two hundred pounds pressure, which in my machine will give an unbalanced pressure of one hundred pounds to work with, the cylinder needs to contain only two cubic feet of one hundred pounds air. Hence where a cylinder in my apparatus required a cubical contents of two cubic feet the cylinder in the ordinary compressor apparatus requires a cubical contents of seven or eight cubic feet in order to effect the same compression at one stroke. This makes manifest the essential difference in respect of size between the two machines, said difference being dependent upon the fact that in one case the compressor operates upon atmospheric pressure air, while in my compressor it acts upon air having already a very high pressure, and this therefore demonstrates the value of my invention in making a small compact machine which is found in practice to have less than half the weight of certain other popular machines doing a similar work.

Another advantage accruing directly from my invention is an increase in efficiency. This may be proved by another simple calculation, as follows: When a volume of air is compressed to one-half, a certain amount of the energy generated is lost through the heating of the air and the consequent dissipation of energy in the form of heat. When a volume of air is compressed to one-third, a certain greater amount of power is lost through heat. When, therefore, a volume of air is compressed to one-seventh, as is the case when atmospheric pressure air is converted into air having a pressure of one hundred and fifteen pounds to the square inch, so as to give an unbalanced pressure of one hundred pounds, a very much greater amount of power is lost through the dissipation of heat energy than is the case when the air is compressed to half its volume, as in my machine, where air at a hundred pounds pressure is compressed to two hundred pounds, so as to give the same unbalanced pressure of one hundred pounds. Therefore it will be seen that I lose very little power from heat, and hence increase the efficiency of the machine very greatly. It is found in actual practice, which also is confirmatory of theoretical calculations on the subject, that a very much greater per cent. of the power generated at one end of the machine is applied to the work at the other end of my machine than is the case in any other with which I am familiar.

Other advantages belonging to my invention might be referred to, but it is deemed unnecessary, as the two which have just been described are sufficient to indicate the importance of my improvement.

Numerous details in the construction and relative arrangement of the parts of the machine herein described may be made without departing from the invention, and I reserve the liberty of varying the same as experience may suggest within wide limits.

Having thus described my invention, what I claim as new, and desire to secure by Letters Patent, is—

1. In an apparatus for transmitting power by means of compressed air or other gas circulating in a closed system at two unequal pressures, both above normal atmospheric pressure, the combination of a compressor, a machine to be driven by the power thereby generated, an air-conduit between the compressor and the driven machine containing air at a certain lower pressure and another air-conduit between the compressor and the driven machine containing air at a certain higher pressure, and means for keeping the geometric ratio of the two pressures constant.

2. In an apparatus for transmitting power by means of compressed air or other gas or fluid circulating in a closed system at two unequal pressures, both above normal atmospheric pressure, the combination of a compressor, a machine to be driven thereby, two air-conduits between the compressor and the machine containing air at the unequal pressures, and a governor for keeping the geometrical ratio of the two pressures constant and regulating the speed of the compressor in proportion to the work to be done by the driven machine.

3. In an apparatus for transmitting power by means of compressed air or other gas circulating in a closed system at two unequal pressures, both above normal atmospheric pressure, the combination, with a compressor, a driven machine, and air-conduits between the compressor and the driven machine, of an inlet-valve for admitting atmospheric air to the compressor in charging, a valve in the low-pressure conduit adapted to be closed in charging, and a connection between the two conduits provided with a valve adapted to be operated by hand to make a temporary communication between said conduits during the operation of charging.

4. In an apparatus for transmitting power by means of compressed air or other gas circulating in a closed system at two unequal pressures, both above normal atmospheric pressure, the combination of a compressor, a driven machine, air-conduits between the compressor and driven machine, an inlet-valve for admitting atmospheric air to the compressor in charging, a valve in the low-pressure conduit adapted to be closed in charging, a connection between the two conduits provided with a suitable hand-valve, whereby the operator in charging may temporarily establish communication between the conduits, and an air-governor for keeping the ratio of the two pressures constant and for regulating the speed of the compressor in proportion to the amount of work to be performed by the driven machine, together with suitable connections between the air-conduits and the governor.

5. In an apparatus for transmitting power by means of compressed air or other gas circulating in a closed system at two unequal pressures, both above normal atmospheric pressure, the combination of the compressor, a motor for actuating it, a driven machine, two air-conduits between the compressor and driven machine containing air at two unequal pressures, and a governor for keeping the geometric ratio between the two pressures constant by regulating the speed of the motor which drives the compressor and also for regulating the speed of the compressor in proportion to the amount of work to be performed by the driven machine.

6. In an apparatus for transmitting power by means of compressed air circulating in a closed system at two unequal pressures, both above normal atmospheric pressure, the combination of a compressor, a suitable steam-engine for actuating the same, a motor or apparatus to be driven by the compressed air, two air conduits or channels between the compressor and this machine containing air at unequal pressures, and an air-governor for keeping the geometric ratio between these two pressures constant, said governor controlling a valve in the steam-supply pipe of the engine and thus regulating the speed of the compressor so as to keep the ratio of pressures constant, said governor having also the function of proportioning the speed of the compressor to the amount of work to be performed, substantially as herein described.

7. In an apparatus for transmitting power by means of compressed air or other gas circulating in a closed system at two unequal pressures, both above normal atmospheric pressure, the combination of a compressor, a machine to be driven by the compressed air, an air-conduit between the compressor and the driven machine adapted to contain air at the lower of the pressures, another air-conduit between the compressor and the driven machine adapted to contain air at the higher of the two pressures, a suitable motor for actuating the air-compressor, an inlet-valve for admitting atmospheric air to the compressor in charging, a valve in the low-pressure conduit adapted to be closed in charging, a connection between the two conduits provided with a hand-valve, whereby the operator during the process of charging up the apparatus may temporarily establish a communication between said conduits, an air-governor containing two pistons whose areas have a ratio equal to the ratio between the two air-pressures, said governor controlling the speed of the motor which actuates the compressor and discharging the double function of maintaining a constant geometric ratio between the two air-pressures and also proportioning the speed of the compressor to the amount of work to be performed by the driven machine, a low-pressure air-pipe running from the low-pressure conduit to the low-pressure end of the governor, and a high-pressure pipe running from the high-pressure conduit to the high-pressure end of the governor.

8. In an apparatus for transmitting power by means of compressed air circulating in a closed system at two unequal pressures, both above the normal atmospheric pressure, the combination of a compressor, a suitable motor for actuating it, a machine to be driven by the power of the compressed air, two air-conduits between the compressor and the driven machine containing air at unequal pressures, an air-governor having two pistons whose areas have the same ratio as that between the unequal air-pressures and having also a valve-chamber containing a valve which controls the supply-pipe leading to the motor which actuates the compressor, said valve being regulated by the movement of the governor-pistons, a low-pressure pipe running from the low-pressure conduit to the low-pressure end of the governor, and a high-pressure pipe running from the high-pressure end of the conduit to the high-pressure end of the governor, so that the governor-pistons may be balanced between the two pressures.

9. In an apparatus for transmitting power by means of compressed air or other gas circulating in a closed system at two unequal pressures, both above normal atmospheric pressure, the combination of a compressor having its cylinder or cylinders provided with a low-pressure compartment and a high-pressure compartment, the low-pressure compartment being provided with suction-valves which admit to the bore of the cylinder and the high-pressure compartment being provided with discharge-valves which lead from the bore of the cylinder, an inlet-valve for admitting atmospheric air to the compressor in charging, a driven machine, an air-conduit between the compressor and the driven machine which contains air at the lower of the pressures, another air-conduit between the compressor and the machine which contains air at the higher of the pressures, a valve in the low-pressure conduit adapted to be closed in charging, and a connection between the two conduits provided with a hand-valve, whereby the operator during the process of charging up the apparatus may temporarily establish a communication between the two conduits.

10. In an apparatus for transmitting power by means of compressed air or other gas circulating in a closed system at two unequal pressures, both above normal atmospheric pressure, the combination of a compressor having its cylinder or cylinders provided with a low-pressure compartment having suction-valves leading into each end of the cylinder-bore, and provided also with a high-pressure compartment having discharge-valves leading from each end of the cylinder-bore, a low-pressure pipe entering the low-pressure compartment of the cylinder and running to the driven machine, said pipe being provided with an inlet-valve to admit atmospheric air to the cylinder and also with a valve at a suitable distance from the cylinder, which is closed in charging, and a high-pressure pipe entering the high-pressure compartment of the cylinder and running to the driven machine, together with a connection between said pipes provided with a suitable valve, whereby the operator may during the operation of charging up the apparatus temporarily establish a communication between the two conduits, and a governor for keeping the ratio of the two unequal air-pressures constant by regulating the speed of the motor which drives the compressor and for proportioning the speed of the compressor to the amount of work to be performed by the driven machine.

11. In an apparatus for transmitting power by means of compressed air, the combination of a compressor having its cylinder or cylinders provided with two longitudinal compartments, one of which is a low-pressure compartment and the other a high-pressure compartment, the low-pressure compartment having suction-valves at each end of the cylinder-bore and the high-pressure compartment having discharge-valves at each end of the cylinder-bore, a driven machine, two air-conduits between the compressor and the machine containing air at the two unequal pressures, and the governor for keeping the pressures at a constant geometric ratio by regulating the speed of the motor which actuates the compressor and for proportioning the speed of the motor to the amount of work to be performed by the driven machine.

12. In an apparatus for transmitting power by means of compressed air, the combination of a compressor, a driven machine, an air-conduit connected thereto and containing the air at the lower pressure, another air-conduit containing the air at the higher pressure, a governor device for keeping the ratio of these two unequal air-pressures constant and for proportioning the speed of the compressor to the amount of work to be performed by the driven machine, together with an inlet-valve for admitting atmospheric air to the compressor in charging, a valve in the low-pressure conduit adapted to be closed in charging, and a suitable hand-valve in a connection between the two conduits, whereby the operator during the process of charging the apparatus may temporarily establish a communication between the conduits.

13. In a machine for transmitting power by means of compressed air, a compressor consisting of a cylinder or cylinders having hollow heads, a water-jacket surrounding the cylinder-bore, two longitudinal compartments within the cylinder, one adapted to contain low-pressure air and the other high-pressure air, both pressures being above normal atmospheric pressure, one compartment being entered by a low-pressure pipe and the other by a high-pressure pipe, respectively, which pipes run to a driven machine and are connected by a pipe provided with a suitable valve, which is temporarily opened by the operator during the process of charging up the apparatus, and the suction and discharge valves at each end of the cylinder-bore.

14. In a machine for transmitting power by means of compressed air, the herein-described compressor consisting of a cylinder or cylinders having the partitioned heads whose chambers are connected by channels to form two compartments in the cylinder, a high-pressure and a low-pressure compartment, together with the suction and discharge valves at each end of the cylinder-bore, the suction-valves entering the low-pressure compartment and the discharge-valves entering the high-pressure compartment, said suction-valves consisting, essentially, of the cylindrical casing, the casting for supporting the valve-stem and the spring, said suction-valves opening inwardly into the cylinder-bore, and said discharge-valves consisting, essentially, of the cylindrical perforated casings, the castings supporting the valve-stem and the spring, and said discharge-valves opening outwardly from the cylinder-bore, substantially as described.

15. In a machine for transmitting power by means of compressed air, the combination of the compressor having a cylinder or cylinders provided with the partitioned heads, the channels communicating between the chambers of said heads to form a low-pressure and a high-pressure compartment within the cylinder and the discharge and suction valves at each end of the cylinder-bore, said suction-valves belonging to the low-pressure compartment and said discharge-valves belonging to the high-pressure compartment, said suction-valves having a casing, a casting supporting the valve-stem and a spring, and said discharge-valves having a casing, a casting supporting the valve-stem and a spring, the suction-valves opening inwardly into the cylinder-bore and the discharge-valves opening outwardly therefrom, a driven machine, and an air-conduit running from the low-pressure compartment to said machine and the air-conduit running from the high-pressure compartment to said machine, the air in the two conduits being of unequal pressures and maintained at a fixed geometric ratio by a governor having the double function of keeping these pressures constant and of proportioning the speed of the compressor to the amount of work to be performed by the driven machine.

16. In a machine for transmitting power by means of compressed air, the combination of a compressor consisting of a cylinder or cylinders having two longitudinal compartments, a high-pressure and a low-pressure, the suction and discharge valves at each end of the cylinder-bore, said suction-valves opening inwardly into the bore from the low-pressure compartment and said discharge-valves opening outwardly from the bore into the high-pressure compartment, a machine driven by the compressed air, an air-conduit between the compressor and the machine containing air at a certain lower pressure, another air-conduit between the compressor and the machine containing air at a certain higher pressure, suitable valves for use in charging the apparatus and creating the two unequal pressures, and a device for keeping the ratio of the two pressures constant and for proportioning the speed of the compressor to the amount of work to be performed by the driven machine.

17. In a machine for transmitting power by means of compressed air, the combination of the duplex compressor having two cylinders, each provided with two compartments, a high-pressure and a low-pressure, and suction and discharge valves on each end of the cylinder-bore, the discharge-valves opening from the bore into the high-pressure compartment and the suction-valves opening into the bore from the low-pressure compartment, low-pressure pipes entering the low-pressure compartment of each cylinder, said pipes being connected together, high-pressure pipes entering the high-pressure compartment of each cylinder, said high-pressure pipes being connected together, one of said high-pressure pipes being the main high-pressure pipe and running to the driven machine and one of the low-pressure pipes being the main low-pressure pipe and running to the driven machine, a valve in the main low-pressure pipe, and the connection between the main low-pressure and main high-pressure pipes provided with a suitable valve adapted to be temporarily opened by the operator during the process of charging up the apparatus, so as to establish a communication between the low-pressure and high-pressure air-pipes, substantially as described.

18. In a machine for transmitting power by means of compressed air, the combination of the duplex compressor having two cylinders, the engine for actuating the said compressor, low-pressure pipes entering the low-pressure compartment of said cylinders, each of said low-pressure pipes being provided with an inlet-valve to admit atmospheric air in charging up the apparatus, the high-pressure pipes entering the high-pressure compartment of each cylinder, one of the high-pressure pipes being the main high-pressure pipe and one of the low-pressure pipes being the main low-pressure pipe, a valve in the main low-pressure pipe, a driven machine which is entered by the main low-pressure and main high-pressure pipes, a connection between these two pipes provided with a valve, and a governor for keeping the ratio between the two unequal air-pressures constant at all times.

19. In a machine for transmitting power by means of compressed air, the combination of a compressor having a pair of cylinders, a steam-engine for actuating this compressor, a driven machine adapted to be operated by compressed air, the low-pressure pipe K, entering the low-pressure compartment of one cylinder, provided with an inlet-valve to admit atmospheric air in charging, provided also with another valve and running to the driven machine, the low-pressure pipe L, entering the low-pressure compartment of the other cylinder, provided with an inlet-valve for admitting atmospheric air and connected with the low-pressure pipe K by the pipe $L^3$, the high-pressure pipe M, entering the high-pressure compartment of one cylinder and running to the driven machine, the high-pressure pipe G, entering the high-pressure compartment of the other cylinder and connected with pipe M by the pipe G', and the connection N between pipes K and M, provided with valve N', substantially as described.

20. The combination of the compressor having two cylinders, the driven machine, the low-pressure pipe K, having a branch pipe K', provided with an inlet-valve $K^2$ and having also a valve $m$, the low-pressure pipe L, entering the other cylinder and having a branch pipe L', provided with an inlet-valve $L^2$, said pipe L connected to the pipe K by the pipe $L^3$, the high-pressure pipe M, entering one cylinder and running to the driven machine, the high-pressure pipe G, entering the other cylinder and connected with pipe M by pipe G', and the pipe N between pipes K and M, provided with valve N'.

21. In a machine for transmitting power by means of compressed air, the combination of the compressor having two cylinders B and B', the motor for actuating this compressor, the driven machine, the low-pressure pipe K, entering cylinder B', having branch pipe K', with inlet-valve $K^2$, and having also valve $m$ and gage $o$, the low-pressure pipe L, entering the cylinder B and having branch pipe L', with valve $L^2$, said pipe L connecting with pipe K by pipe $L^3$, the high-pressure pipe G, entering cylinder B', the high-pressure pipe M, entering cylinder B and connected with pipe G by pipe G', said pipes K and M running to the driven machine and connected by pipe N, having valve N', together with the governor for keeping the unequal air-pressures at a constant ratio, and the pipes $n$ and $n'$, running to said governor.

In testimony whereof I affix my signature in presence of two witnesses.

CHARLES CUMMINGS.

Witnesses:
WM. L. BOYDEN,
GEO. L. CLARK.